May 21, 1940. F. K. DANIEL 2,201,812
PROCESS OF CONCENTRATING AND DIALYZING WASTE
PULP LIQUOR AND THE PRODUCT THEREOF
Filed July 17, 1939 4 Sheets-Sheet 1

Fig. 1.

STEP-1   WASTE WOOD PULP LIQUOR
         E.G. WASTE SULPHITE SPRUCE LIQUOR
                ↓ LIME

STEP-2   NEUTRALIZED LIQUOR
                ↓ VACUUM EVAPORATOR E.G. 20 TO 27 INCHES

CONCENTRATED LIQUOR
         E.G. 18° TO 30° Be

STEP-3   THEN    SMALL AMOUNTS OF $H_2SO_4$ AND $Na\,HSO_4$—
                 REPEATED IF DESIRABLE WITH INTERMEDIATE
                 VACUUM CONCENTRATION WITH SEPARATION
                 OF PRECIPITATE AS BY FILTRATION

CALCIUM FREED OR REDUCED
         CONCENTRATED LIQUOR

STEP-4           DIALYSIS WITH OR WITHOUT HEATING
                 TO 150°F AND/OR ADDITIONS OF
                 AMMONIA REPEATED WITH VACUUM
                 CONCENTRATION IF DESIRED

CONCENTRATED LIQUOR FREED OF
         DIALYZABLE MATERIALS

STEP-5           VACUUM CONCENTRATION E.G. 20 TO 27 INCHES
                 OF VACUUM WITH OR WITHOUT SUBSEQUENT
                 VACUUM DRUM DRYING

CONCENTRATED SURFACE (E.G. 30% TO 95% SOLIDS)
         ACTIVE MATERIAL

INVENTOR
Friedrich K. Daniel
BY
ATTORNEY

May 21, 1940.  F. K. DANIEL  2,201,812
PROCESS OF CONCENTRATING AND DIALYZING WASTE
PULP LIQUOR AND THE PRODUCT THEREOF
Filed July 17, 1939  4 Sheets-Sheet 2

INVENTOR
Friedrich K. Daniel
BY
ATTORNEY

Patented May 21, 1940

2,201,812

UNITED STATES PATENT OFFICE 2,201,812

PROCESS OF CONCENTRATING AND DI-
ALYZING WASTE PULP LIQUOR AND THE
PRODUCT THEREOF

Friedrich Konrad Daniel, Kew Gardens, N. Y.

Application July 17, 1939, Serial No. 284,844

24 Claims. (Cl. 260—124)

This invention relates to surface-active materials and, particularly, to surface-active materials which are obtained from waste liquors resulting from the treatment of wood to make paper pulp.

A surface-active material is a substance which tends preferentially to accumulate in the interface between two other materials, the one forming a continuous phase surrounding the other which is discontinuous and finely divided. Extremely small quantities of surface-active materials by their presence concentrated at the interface may change to a very marked extent the physical and sometimes the chemical properties of such a two phase mixture. The discontinuous phase may be a solid, a liquid, or a gas, and the continuous phase may be a plastic solid, a liquid, or a gas.

The extent to which a surface-active agent can change the properties of a mixture depends upon its own properties and upon the amount of surface per unit of weight or volume present in the mixture. Therefore, surface-active materials are of importance wherever very finely divided liquids or solids are incorporated into gaseous, liquid or plastic mediums. Familiar examples are: colors and pigments dispersed in paints, inks and similar products; pigments in compounded rubber and other plastic materials; clay slip in the manufacture of chinaware; oil drilling muds; addition agents in fine grinding of cement; in the flotation of ores; in emulsions of all kinds and in many other similar applications.

It has been known that the waste liquors resulting from the manufacture of paper pulp from wood are useful as surface-active agents, and various methods have been used to purify and concentrate these waste liquors to improve their usefulness.

Waste sulphite liquor is a mixture of many different chemical compounds. In order to make my invention clear, I classify these compounds in two groups: (1) high molecular materials of a colloidal or semi-colloidal character which are usually spoken of as lignins; (2) low molecular substances consisting mostly of sugar-like and gum-like compounds, and organic and inorganic salts and acids.

The high molecular substances of the first group are compounds which do not pass through thin Cellophane membranes. The lower molecular substances are compounds which do pass through such membranes. When a solution containing both is subjected to dialysis against water the high molecular or colloidal fraction of most waste liquors is usually 50% or less of the total solids contained in the liquor.

Classifying the ingredients of the sulphite liquor with respect to their value as surface-active agents, we can say that there is (1) a group of compounds which have desirable and in some respects unusual surface-active properties, and (2) a fraction that definitely counteracts the surface-activity of the first group and is, therefore, harmful, and (3) possibly a third fraction exhibiting no pronounced properties either way and which, therefore, acts as an inert diluent.

I have found that it is in the high molecular or colloidal fraction of the liquor that the valuable principle of the liquor is concentrated.

I have found that the high molecular fraction, in which the valuable surface-active materials are concentrated, is very easily changed into substances having either much less or no value at all as surface-active agents by heating for relatively long periods of time or at relatively high temperatures, or by drastic chemical reactions.

The methods which have been used in the past to concentrate and purify the surface-active component of the waste sulphite liquor have either not carried this purification to the point where the resulting product is sufficiently free of the harmful components of the original liquor to be a really effective agent, or have relied upon some chemical reaction which has changed the composition of the surface-active component so that even though in relatively pure state, its surface-active properties have been greatly reduced.

The object of my invention can be stated briefly to be the nearly complete purification of this surface-active component without chemically changing its properties so as to reduce its activity as a surface-active agent.

This objective I realize in two steps: (1) a preliminary treatment by which I concentrate the original liquor as it comes from the pulp digester, and remove part of the objectionable matter by chemical methods; (2) the isolation of the high molecular fraction by physical treatment. It is especially in the first step of my process that care must be taken to avoid any action which will materially change the composition of the active high colloidal fraction. Any chemicals which are added for this preliminary treatment must be of a character and an amount which will result in reactions with the impurities, but not in reactions with the colloidal component itself. One procedure which I have found satisfactory for this preliminary purification and concentration is as follows:

The dilute waste liquor as it comes originally from the digesters is first neutralized with milk of lime, caustic soda, or other suitable alkali material. Care is taken not to add an excess of alkali. The solution is then concentrated to about 30–32° Bé. in vacuum evaporators with air excluded. Care must be taken not to heat the solution above 100° C., and preferably not above 90° C.

The purpose of excluding air is to prevent changes in the composition of the active colloidal fraction due to oxidation. Consequently, it is not absolutely essential to exclude all air, although it is preferable to keep this oxidation as little as possible.

The concentrated liquor contains at this point about 2% of combined lime and this may advantageously be removed by treating the solution while it is subjected to agitation with less than the theoretical amount of sulphuric acid required to form calcium sulphate with all the lime that is present. The solution is agitated until the reaction is completed. Sodium bisulphate or any equivalent alkali metal bisulphate is added in just sufficient quantity to precipitate the remainder of the lime, care being taken not to add an excess. The alkali metal bisulphate is dissolved in the smallest possible amount of water before it is added to the liquid. The solution is agitated for some time and is then filtered to remove the precipitated matter.

Inasmuch as this purification should be conducted in such a way as not to leave any excess of acid or bisulphate in solution, the complete precipitation of the calcium can advantageously be done in several steps, repeating the process as above outlined. This treated liquor, which is essentially free from calcium, has improved surface active properties as compared with the unprocessed sulphite liquor. Yet this product does not show those surface-active properties which are characteristic of the much purer product of my invention.

I have found that the unchanged colloidal complex of the sulphite liquor can be isolated in a highly concentrated and pure form by a process of prolonged and controlled dialysis against water in a continuous type dialyzer, using thin regenerated cellulose sheets, as diaphragms.

The essential features of my invention and how the same is practiced will become apparent from the following description, which is given by way of example.

A concentrated sulphite liquor, pretreated as described above, is fed into a continuous dialyzer, such as, for instance, the type consisting of a number of vertical frames with grids, between which regenerated cellulose or denitrated nitrocellulose membranes or other colloidal membranes, such as parchment, are placed so that closed cells are formed. The frames are so constructed that the liquor enters every other cell at the bottom and the dialyzed product leaves the machine from the top of the same frame. The water enters the alternate cells from the top and leaves at the bottom.

For the dialysis of waste sulphite liquor the frames have to be made of stainless steel or other non-corrosive material, or have to be coated with a material resisting the attack of the liquor, such as Bakelite.

Example I 35 grams per minute of a concentrated spruce liquor containing 51% total solids previously treated to remove calcium salts was fed into the dialyzer having a total capacity of fifteen (15) gallons and five thousand (5,000) square inches dialyzing surface, using three hundred (300) P. T. Cellophane membranes.

The water was fed at an approximate rate of 300 grams per minute and was found to carry away a total of 43% to 48% of the original solid content of the concentrated spruce liquor.

Continuation of the dialysis process beyond the limits described did not increase the amount of solids removed from the liquor much, indicating that a substantially complete dialysis was obtained.

It appears that part or all of the low molecular fraction, passing through the cellophane membranes, and representing about 50% of the original solids, contains the substances, the presence of which detrimentally affects the character of the colloidal fraction in the liquor or which are inert diluents. In the remaining 50%, the high molecular fraction, I have isolated the most valuable ingredients of the liquor, without having disadvantageously affected or changed the molecular structure. The ash content of this fraction was approximately 5% to 6% and its pH was between 3.7 to 3.8 at a concentration of 15 grams per liter.

The liquor leaving the dialyzer was found to be greatly diluted, having about 12 to 15% solids. This product was concentrated up to 35% solids under reduced pressure, i. e. under 20 to 27 inches of vacuum.

A slightly modified method consists of feeding the liquor faster than indicated above and repeating the process with the same portion several times over, so that the total feed will be at the same rate as when dialysis is completed in one pass. In this way dialysis of a given quantity of liquor may be completed in a shorter time, or in the same period of time a slightly greater quantity of liquor may be dialyzed, especially if the diluted liquor leaving the dialyzer is concentrated under vacuum before it re-enters the dialyzer.

The best results are obtained if the specific gravity of the liquor entering the dialyzer is between 1.15 to 1.25.

Example II

A waste spruce sulphite liquor concentrate of 51% solid content, previously treated to remove calcium salts, was fed into the dialyzer at a rate of 75 grams per minute. The water was fed at an approximate rate of 300 grams per minute, carrying away about 25% to 28% of the original solid content, depending on the condition of the membranes. A new membrane permits a slightly faster dialysis than a membrane used for several days. The average lifetime of a 300 P. T. Cellophane membrane I found to be 18 to 21 days.

The partly dialyzed, dilute liquor was concentrated under 25 inches vacuum to 40% concentration and fed back into the dialyzer at a rate of 67 grams per minute. This time the water carries away 24% to 26% of the total solids of the partly dialyzed liquor. This corresponds to a total loss of solids of between 43% to 47%. An average of 10.25 grams of the dry finished material is produced per minute, as compared to 9.71 grams of equal purity in Example I. This represents an average improvement in the dialysis process of 5.5%.

A preferred method of operating my invention consists of heating the water and/or the liquor before they enter the dialyzer. The temperature of the liquids should be between 100° F. to 150° F., depending on how much heat the membrane can stand without breaking and also depending on the temperature at which the liquor will begin to decompose.

Example III

The water coming from a constant level tank at the rate of 300 grams per minute is heated to 120° F. by an immersion heater just before it enters the dializer. The liquor of 51% concentration is fed at a rate of 75 grams per minute. Entering the dialyzer at a temperature of 80° F., it leaves the dialyzer at a temperature of about 115° F., while the waste water, carrying with it 33% to 36% of the total solids, leaves at a temperature of about 90° F. The resulting improvement in the dialyzing efficiency is about 29% to 32%.

This liquor is then vacuum concentrated to 40% solid content and fed again into the dialyzer at the rate of 90 grams per minute, the water, having a temperature of 120° F., again being fed at 300 grams per minute. 22% to 24% of the solids are taken out this time, bringing the total percentage of the dialyzed low molecular substance to 48% to 51%.

This is as complete a dialysis as can take place in this liquor under any circumstances. An average of 11.4 grams per minute of the dry, high molecular substance is dialyzed completely as against 10.25 grams of lesser purity with cold water, which is an improvement of more than 11%.

An even more effective form of dialysis consists of heating the liquor instead of the water. Where this is done care must be taken not to overheat the liquor or any part thereof in order to prevent its partial decomposition.

A great advantage of heating one (or both) of the dialysis liquids, apart from being quicker and therefore more economical, consists in the suppression of mould growth which otherwise is quite a serious problem. On the other hand, a disadvantage of the heating methods is that it shortens the life of the membranes by about 20% to 40%. It may be preferable to use a 450 or even 600 P. T. membrane instead of the 300 P. T. in order to counterbalance this effect.

In another method of purifying the spruce liquor, small amounts of ammonia are added to the water before it goes into the dialyzer. The ammonia will almost completely pass into the colloidal fraction, forming ammonium salts therein. Where the ammonium salts and/or free ammonia in the purified liquor do not have adverse effects, this method is superior to dialysis against pure cold water, as it increases the rate of dialysis. The process as described herein is indicated diagrammatically in the drawings.

Figure 1:
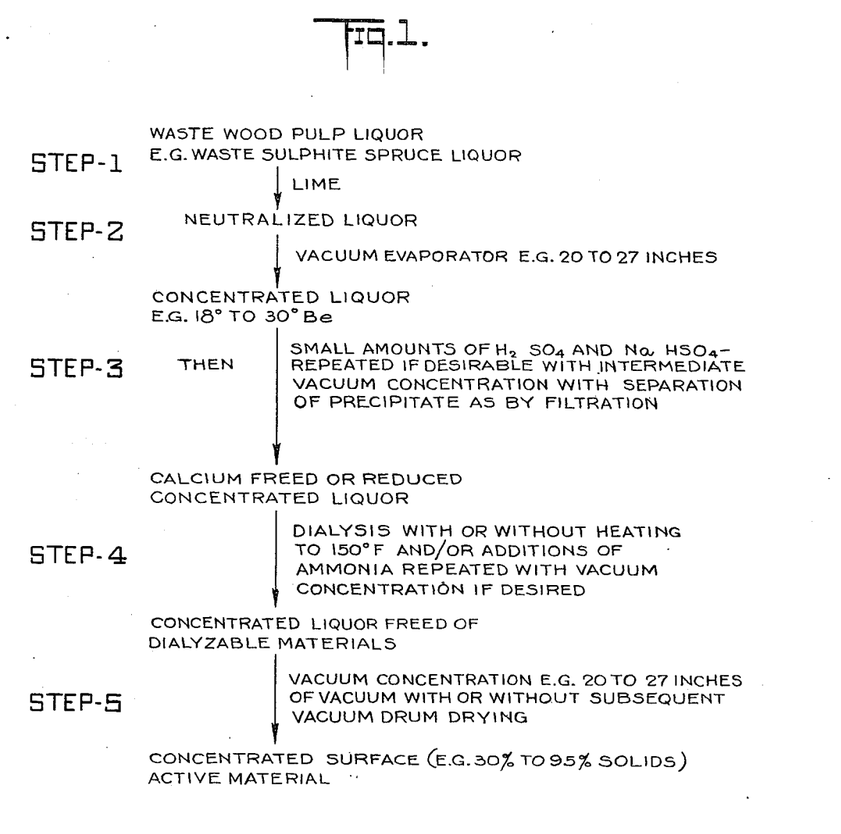
Fig. 1 is a diagrammatic flow chart illustrating the different steps in the process.

In step 1, the original waste liquor coming from the kettle is neutralized. In step 2, the neutralized liquor is vacuum concentrated. In step 3, part or all of the lime is removed by successive treatments with small amounts of sulfuric acid and sodium acid sulphate, which treatments may be repeated with an intermediate vacuum concentration.

The calcium sulphate which is precipitated may be removed by a filtration procedure or in some other suitable manner.

In step 4, the reconcentrated product of steps 1, 2 and 3 is dialyzed, for example through regenerated cellulose or parchment diaphragms with or without heating up to 150° F. and with or without additions of ammonia and with or without intermediate vacuum concentrations. In step 5, the dialyzed liquor is finally concentrated to for example about 35% of solids under a vacuum of 20 to 27 inches.

The process of this invention may also be carried out with other waste liquors and/or waste liquors in which step 3 has been omitted. In that case step 4 will take correspondingly longer. It is quite essential, however, for our process that step 2 (concentration) is carried out prior to step 4. Theoretically a substantially complete dialysis could be practiced without step 2, but if it were attempted, the time required would be so long, and the product obtained would be diluted with such a volume of water, that even as a laboratory experiment a product approximating the purity of my new product would be very difficult, if not impossible to obtain.

For this reason it has been found not satisfactory to dialyze unconcentrated liquors, and dialysis, when practiced upon unconcentrated solutions has been found not to produce a product having the valuable properties of the material produced according to the present invention.

On the other hand dialysis of concentrated waste wood pulp liquors will not produce satisfactory results or a product having the properties of the product of the present invention where such liquors are subjected to pretreatments such as for example involving concentration at atmospheric pressure and/or in the presence of air. Under these circumstances it appears that the colloidal complexes present would undergo such modification or change in chemical structure as to decrease or even destroy the most valuable surface-active properties thereof.

The product made according to this invention clearly differs from all other products made from waste liquors of which I know. It exhibits novel and quite unusual features which the original waste liquor does not possess. The following is a description of the nature of my new product and the properties it displays:

The high molecular fraction leaving the dialyzer is completely water soluble in acid, neutral and alkaline media. It has a pleasant aromatic odor instead of the unpleasant smell of waste sulphite liquor. At equal concentration it is more viscous than the original liquor.

The isolated, high molecular fraction alone is relatively stable as compared to the undialyzed liquor. It is possible, to heat the dialyzed liquor at atmospheric pressure without immediately developing obnoxious gases or otherwise changing the character or causing decomposition of the colloidal complex.

A typical analysis of the dialyzed and undialyzed liquor, computed on a 100% solid basis, is as follows:

|  | Undialyzed | Dialyzed |
| --- | --- | --- |
| Ash percent | 5.19 | 5.15 |
| Iron do | 0.008 | 0.008 |
| CaO do | 0.160 | 0.090 |
| MgO do | 4.21 | 3.48 |
| Acidity (as acetic acid) do | 8.06 | 2.68 |
| pH (15 gr. per liter) | 2.94 | 3.75 |
| Sulphur percent | 6.48 | 7.00 |
| Sugars do | 17.7 | None |

It appears that the greatest change effected by dialysis is in the acidity, pH value, and sugar and magnesium oxide content. These ingredients have been removed without causing a simultaneous change in the structure and character of the colloidal complex. This fact, of course, is not apparent from the result of the analysis. It can be recognized only by testing the properties of the material and comparing them with the undialyzed product and with products obtained from waste liquors processed otherwise.

Figure 2:
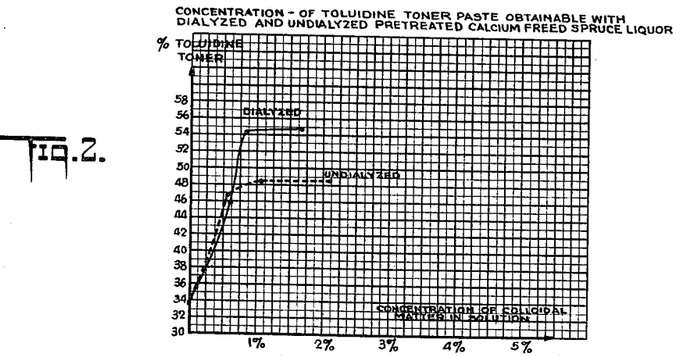
Figs. 2 to 6 are graphs showing curves illustrating the properties of the novel products of the present invention resulting from the processes herein set forth as compared to products not so processed, and Figs. 7 and 8 diagrammatically illustrate a dialysis apparatus, Fig. 7 being an end elevational view and Fig. 9 being a side elevational view.
Figure 5:
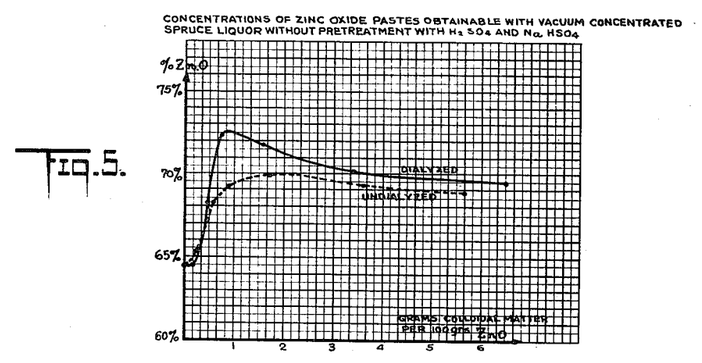
Figure 6:
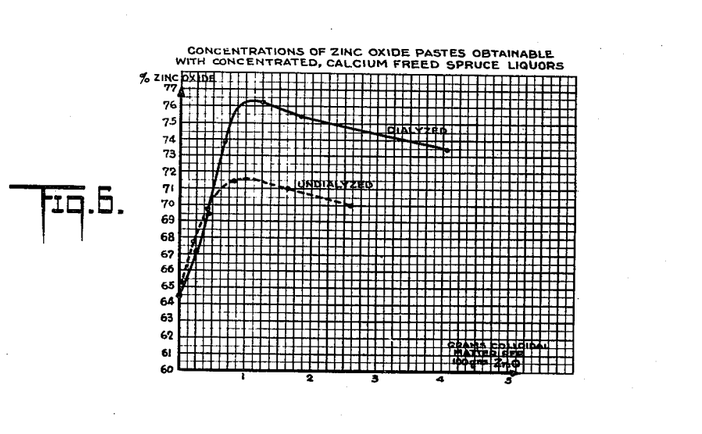

For instance, the product leaving the dialyzer proves to be a particularly effective dispersing agent which will disperse pigments such as zinc oxide, antimony oxide, lead carbonate, and toluidine toner to a much higher degree than the undialyzed liquor. This will be seen from the following tables and diagrams illustrated upon the attached drawings, Figs. 2, 5 and 6 showing the maximum concentrations of zinc oxide and toluidine toner obtainable in aqueous media at different concentrations of dialyzed liquor. The maximum concentration is the one at which the pigments are just liquefied when mixed on a glass plate with a metal spatula.

In Fig. 2 the curve is based upon the following experimental values:

*Toluidine toner with solutions of a dialyzed and undialyzed vacuum concentrated calcium freed spruce liquor*

| Concentration of colloidal material in dialyzed liquor | Maximum concentration of paste |
|---|---|
| Percent | Percent |
| 0.00 | 33.6 |
| 0.59 | 45.8 |
| 0.84 | 54.3 |
| 1.65 | 54.8 |

| Concentration of undialyzed liquor | | Maximum concentration of paste |
|---|---|---|
| Total solids | Colloidal fraction | |
| Percent | Percent | Percent |
| 0.00 | 0.00 | 33.6 |
| 1.14 | 0.57 | 46.9 |
| 2.14 | 1.07 | 48.4 |
| 4.16 | 2.08 | 49.0 |

In Fig. 5 the curve is based upon the following experimental values:

*Vacuum concentrated spruce liquor in connection with the production of concentrated zinc oxide pastes*

| Concentration (in grams) of colloidal materials in dialyzed spruce liquor per 100 gram zinc oxide | Concentration of zinc oxide paste |
|---|---|
| | Percent |
| 0.00 | 64.5 |
| 0.265 | 65.4 |
| 0.466 | 68.2 |
| 0.764 | 72.4 |
| 1.568 | 71.8 |
| 3.392 | 70.2 |
| 6.480 | 69.5 |

| Concentration in grams) of undialyzed spruce liquor per 100 gram zinc oxide | | Concentration of zinc oxide in paste |
|---|---|---|
| Total solids | Colloidal fraction | |
| | | Per cent |
| 0.000 | 0.000 | 64.5 |
| 0.135 | 0.270 | 64.5 |
| 0.496 | 0.248 | 66.8 |
| 1.128 | 0.564 | 68.3 |
| 1.776 | 0.888 | 69.3 |
| 3.740 | 1.720 | 69.9 |
| 7.232 | 3.616 | 68.9 |
| 11.328 | 5.664 | 67.9 |

In Fig. 6 the curve is based upon the following experimental values:

*Vacuum concentrated and calcium freed undialyzed and dialyzed spruce liquor in connection with the production of concentrated zinc oxide pastes*

| Concentration (in grams) of colloidal material in dialyzed spruce liquor per 100 grams zinc oxide | Concentration of zinc oxide in paste |
|---|---|
| | Per cent |
| 0.00 | 64.5 |
| 0.245 | 67.1 |
| 0.438 | 69.5 |
| 0.708 | 73.9 |
| 1.248 | 76.2 |
| 1.830 | 75.4 |
| 4.04 | 73.5 |

| Concentration (in grams) of undialyzed spruce liquor per 100 grams zinc oxide | | Concentration of zinc oxide in paste |
|---|---|---|
| Total solids | Colloidal fraction | |
| | | Per cent |
| 0.000 | 0.000 | 64.5 |
| 0.476 | 0.238 | 67.8 |
| 0.872 | 0.436 | 69.7 |
| 1.600 | 0.800 | 71.4 |
| 3.264 | 1.632 | 71.0 |
| 51.60 | 2.580 | 70.0 |

In all cases the concentration of the undialyzed spruce sulphite liquor is calculated on the basis of colloidal fraction present, in order to get a fair comparison with the dialyzed liquor of which about 50% solids have been removed by dialysis.

Conseqently, if the achievement of dialysis, according to this invention, was simply a concentration of the surface-active material and elimination of the inert ingredients, the two curves should be identical.

Instead, the curves in most cases do not even run parallel with each other. This shows that a more fundamental change must have taken place by the prolonged dialysis than simply the concentration of the high molecular fraction of the liquor. With the product of the present invention concentrations of pigments may be obtained which cannot be obtained with any amount of the undialyzed material.

This is demonstrated clearly by the following test: 850 gr. zinc oxide (Red Label Anaconda) are placed into a Banbury mixer and 150 gr. of a 4% solution of the dialyzed liquor, i. e., .7% of the dialyzed liquor calculated on the zinc oxide, is added. After a few minutes mixing operation the product has the most surprising property of flowing like a heavy oil in long, glossy strings if left to itself. Yet it behaves like a solid substance if outside force is applied, tending to push or dislocate the mass.

In a jar filled with this material a knife sinks down slowly by itself. If it is forced down, a tremendous resistance has to be overcome, which becomes the greater the harder and quicker the push is. There is a certain amount of elasticity in the system as a whole. If the force with which the knife is thrust into the mass is so great that it breaks or disrupts the material, or if a sudden movement breaks a string of material flowing from the knife, the newly created surface appears dry and brittle for a moment. Immediately afterwards the material begins to flow again, healing the ruptured surface and making it smooth and glossy as before.

Concentrated suspensions of pigments made with lignin isolate from waste liquor by chemical means or with undialyzed waste liquors are either in a fluid state, offering no resistance, or, at higher pigment concentrations, immediately turn into dry, brittle-non-flowing pastes.

This peculiar effect of the dialyzed liquor made according to this invention is not confined to zinc oxide and to the particular concentrations mentioned, but can be produced with a number of other pigments, such as, for instance, lead carbonate, antimony oxide, Hansa yellow, toluidine toner, chrome yellow, etc. over a broad range of concentrations.

Figure 3:
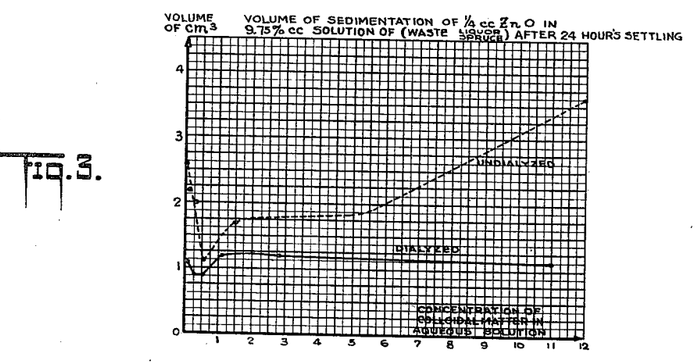

The fundamental difference between the properties of dialyzed and undialyzed sulphite liquor becomes apparent also from the results of the sedimentation tests. Fig. 3 shows the sedimentation volumes, expressed in cc. after different periods of settling.

In Fig. 3 the curve is based upon the following experimental values:

*Volume of sedimentation of zinc oxide in aqueous solution as function of the concentration of dialyzed and undialyzed vacuum concentrated calcium freed spruce liquor*

| Concentration of dialyzed liquor in liquid phase | Volume of lower layer containing the zinc oxide sediment after settling 24 hours |
|---|---|
| Per cent | Cubic centimeters |
| 11.0 | 1.1 |
| 2.8 | 1.2 |
| 1.1 | 1.2 |
| 0.55 | .9 |
| 0.28 | .9 |
| 0.07 | 1.1 |

| Concentration of undialyzed liquor in liquid phase | | Volume of lower layer containing the zinc oxide sediment after settling 24 hours |
|---|---|---|
| Total solids | Colloidal fraction | |
| Per cent | Per cent | Cubic centimeters |
| 24.00 | 12.00 | 3.6 |
| 12.00 | 6.00 | 2.0 |
| 3.00 | 1.50 | 1.7 |
| 1.20 | 0.60 | 1.2 |
| 0.60 | 0.30 | 2.0 |
| 0.3 | 0.15 | 2.2 |
| 0.08 | 0.04 | 2.6 |

This test is made by adding 1.42 grams of zinc oxide (equals ¼ cc. displaced volume) to 9.75 cc. of water with various waste sulphite liquor concentrations in a 10 cc. graduate, and shaking the two vigorously together.

Further evidence of the profound change taking place by prolonged dialysis is the effect of the dialyzed product on latex and other suspensions and emulsions. The undialyzed spruce liquor coagulates a rubber latex instantaneously when added in very small proportion. Corresponding amounts of the dialyzed liquor may be added without such effect.

A particularly useful application of the dialyzed waste sulphite liquor is in dry and wet grinding of solids, such as color pigments, Portland cements, etc.

Figure 4:
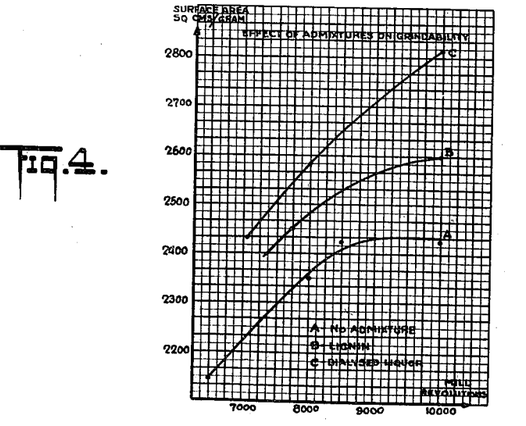

Fig. 4 gives a comparison between the effect of grinding (a) a cement without admixture, (b) a cement with addition of a chemically isolated sulpho-lignin, (c) a cement with addition of a dialyzed liquor prepared in accordance with this invention. The amount used in each case was one part of agent in 3000 parts cement.

It is evident that the effect of the product of this invention is not only quantitatively different but also qualitatively since the two curves do not run parallel, as they should if the effect produced was a function of the amount of admixture added. Instead, the curves diverge, thus indicating the qualitative difference.

In treating cement, unpurified waste liquor could not be used at all, because the sugars in it will destroy the strength of cement.

Another application of dialyzed waste sulphite liquor in cement consists of controlling and influencing the setting time at will. 0.15% to 0.30% of the dialyzed waste liquor, either ground with the cement or added to the mixing water will make certain cements of normal set characteristics set up very quickly, and certain others set up very slowly.

The quick setting type will acquire greatly increased strength, while the slow setting type does not lose the strength it has without addition of dialyzed waste liquor.

An example of the usefulness of such set control is in the cementing of oil wells. In deep wells it is desirable to have a slow setting cement, in shallow wells a quicker setting type is preferred.

Although the process of this invention and the properties of the resulting product have been particularly described for waste sulphite liquor it may be applied also to other wood pulp liquors, such as for example wood pulp liquors derived by the treatment of pine woods and the woods of other coniferous trees, or a mixture of several coniferous trees.

Although it has been found most desirable to use "lime base" waste sulphite liquor, which may or may not be neutralized after removal from the cooking vats, and which may or may not be pretreated to remove calcium, it is likewise possible to utilize "soda base sulphite" liquor. More generally speaking, those waste liquors are most suitable for making surface-active agents according to this invention, in which the colloidal complex has been rendered completely water soluble by $SO_3$ groups, and in which this complex is not precipitated during any phase of the process, and where the complex remains completely water soluble in neutral as well as acid and alkaline solution. A waste liquor of this type, besides lime and soda base sulphite liquors, is the "sodium sulphite process" liquor, produced by cooking wood chips with Na₂SO₃.

Less desirably the invention may also be applied to liquor derived from the "sulphate" or Kraft process, but as a general rule this is not desirable because the lignin materials in such liquor tend to precipitate when the liquor is neutralized or acidified, and it is generally desirable to carry out the processing of the present invention at a pH approaching neutrality as closely as possible.

It has been found in the dialysis operation above described that where a relatively heavy liquor, such as concentrated waste sulphite liquor, must be dialyzed as against a relatively low specific gravity liquor, such as water, the thin diaphragms tend to bulge excessively into the water compartments.

To avoid this difficulty it has been found desirable to place the water in the water compartments under slightly greater head or pressure than the concentrated liquor in the alternating compartments, with the result that although the diaphragms may bulge slightly into the water compartments toward the bottom of the compartments, such bulge will be compensated by a reverse bulge in the upper part of the compartments. In this manner the stress on the membranes may be relieved and they may be stabilized in their position.

For example it has been found satisfactory to give an additional head of 5 to 12 inches to the water for a depth of compartment of about 25 to 35 inches and correspondingly increased or decreased heads may be utilized for compartments of other depths.

It has also been found desirable to place the entire membrane under substantial hydrostatic pressure and the lowest head on the membrane should preferably be, for example in the case of a depth of compartment as above mentioned, about 3 to 10 inches.

Figures 7, 8:
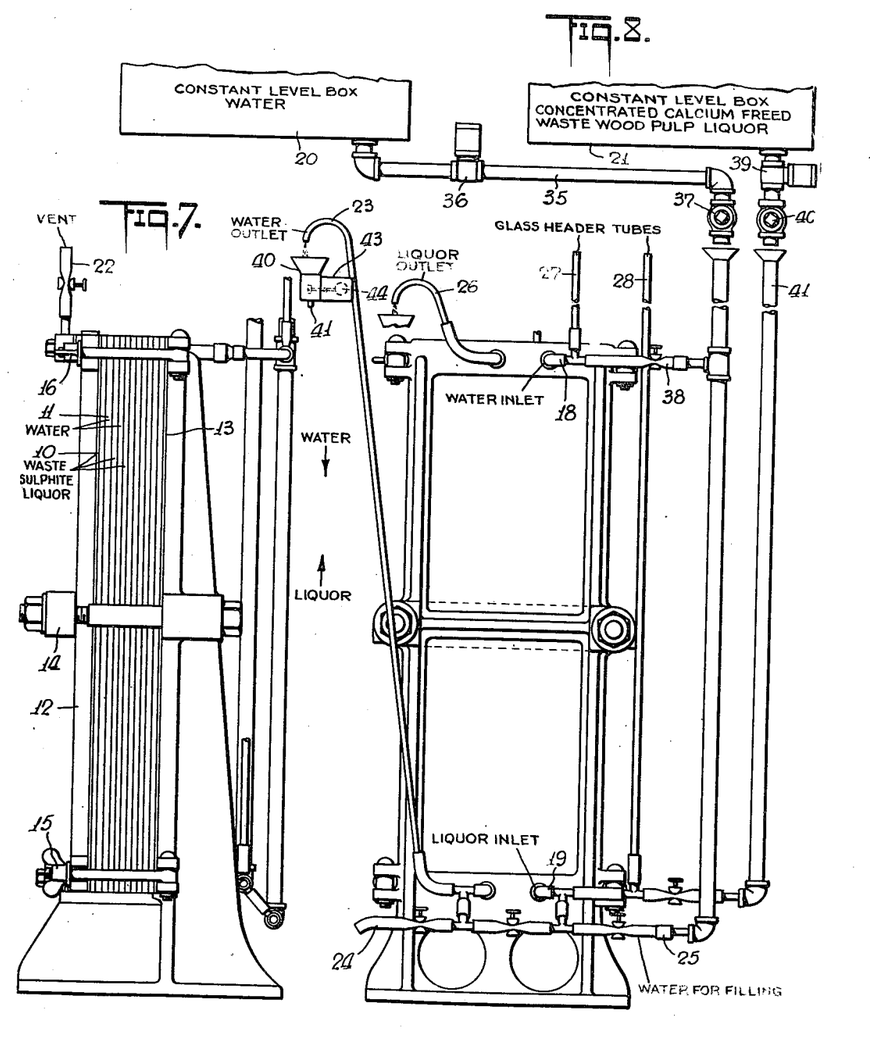

This is diagrammatically indicated upon Figs. 7 and 8 of the drawings, which show a plurality of cells 10 for the waste wood pulp liquor and 11 for the water. The water is desirably caused to flow downwardly in the compartments, while the waste wood pulp liquor is caused to flow upwardly.

The membranes, which as stated before, may be of Cellophane or other forms of regenerated cellulose, are stretched between the compartments 10 and 11 after being prewetted and are held between the end plates 12 and 13. The entire group of dialysis cells are clamped together by the bolts 14, 15 and 16.

The water is caused to flow from a constant level box 20 through the conduit 35 past the solenoid control valve 36 and the manually controlled valve 37 into the inlet conduit 38, from which it enters the cell structure at 18.

The concentrated calcium freed waste wood pulp liquor flows from a constant level container 21 past the solenoid control valve 39, the manual valve 40 and into the conduit 41 to the point 19 where it enters the dialysis apparatus. The water for filling the compartments may flow through the conduit 25 and the conduit 24 may be utilized for drainage.

The dialysis cells are provided with glass header tubes 27 and 28, which enable observation of the head in the groups of the compartments. The groups are also provided with a dialyzing water outlet 23 and with a wood pulp liquor outlet 26.

These outlet connections 23 and 26 by their differential heads regulate the pressure in the compartments.

It will be noted that the outlet 23 is substantially higher than the outlet 26 and that the outlet 26 is sufficiently above the top of the structure to assure a substantial pressure on the compartments which receive the waste wood pulp liquor.

In view of the fact that it is desirable to operate the apparatus continuously 24 hours a day, as otherwise it would require considerable time to restart the apparatus and the layoff might injure the membranes, it is desirable to have an automatic shut-off which will be operative as soon as one or more of the membranes or diaphragms break.

As illustrated diagrammatically, for example, the outlet 26 might discharge into a vessel 40 having an orifice 41 at the bottom thereof and this vessel may be in liquid connection with another vessel 43 having a float device 44. This float device 44 might be connected to a suitable mercury switch or other device which will operate a relay (not shown) connected to a circuit to operate the solenoid valves 36 and 39.

When one or more of the membranes break, the effluent will then pass principally through the lowest outlet 26 and there will be a decreased flow or stoppage of flow through the outlet 23. This change in level in the vessel 40 will actuate the float 44, which in turn will actuate the electrical system (not shown) to close the solenoid valves 36 and 39 and prevent further flow into the dialysis apparatus.

The orifices 41 should be so regulated as to maintain a level in said vessels 40 and 44 during normal operation as will cause the electrical system to remain inoperative.

The float 44 may be caused to operate the electrical system either as a result of a falling level in a vessel fed from the upper outlet 23 or as a result of an increasing level in a vessel fed from the lower outlet 26.

It is to be understood that other useful and novel applications of this product not mentioned specifically in this application are to be included and part of this invention. The above mentioned effects have been described in greater detail only to describe and distinguish clearly my new product from all other waste liquors, treated and untreated, and from any other product derived therefrom.

What is claimed is:

1. In a process of producing a surface-active material from waste wood pulp liquor containing high molecular weight colloidal complexes, the steps of vacuum concentrating the waste wood pulp liquor, and removing low molecular weight substances therefrom without changing substantially the chemical composition of said colloidal complexes.

2. In a process of producing a surface-active material from waste wood pulp liquor containing high molecular weight colloidal complexes, the steps of neutralizing the waste wood pulp liquor, vacuum concentrating and then removing low molecular weight substances therefrom by dialysis.

3. In a process of producing a surface-active material from waste wood pulp liquor containing high molecular weight colloidal complexes, the steps of vacuum concentrating and of removing calcium salts from the waste wood pulp liquor, and then removing low molecular weight substances therefrom by dialysis.

4. In a process of producing a surface-active terial from waste wood pulp liquor containing high molecular weight colloidal complexes, the steps of vacuum concentrating and of removing calcium salts from the waste wood pulp liquor, and then removing low molecular weight substances therefrom by dialysis through a cellulosic membrane.

5. A process of producing surface-active materials from waste sulphite liquor obtained in the manufacture of wood pulp, which comprises concentrating such waste sulphite liquor under a vacuum and then removing low molecular weight substances therefrom while maintaining the chemical structure of the high molecular weight substances therein substantially unchanged.

6. A process of making a sulphite liquor product useful as a surface-active agent, which comprises providing a waste sulphite liquor obtained from the wood of coniferous trees, vacuum concentrating and then dialyzing said liquor.

7. A novel vacuum concentrated waste wood pulp liquor material comprising the substantially unchanged high molecular weight colloidal substances contained in the original liquor, from which has been removed a substantial proportion of the low molecular weight substances contained in the original liquor.

8. A novel vacuum concentrated waste wood pulp liquor material comprising the high molecular weight colloidal substances contained in the original liquor, from which liquor has been removed a substantial proportion of the low molecular weight substances by dialysis.

9. A vacuum concentrated waste sulphite wood pulp liquor containing its high molecular weight colloidal complexes in substantially unchanged form, which has been substantially freed of low molecular weight acids, tri-valent and di-valent mineral salts, and low molecular weight organic substances.

10. A vacuum concentrated waste sulphite liquor having surface-active properties containing its high molecular weight colloidal complexes in substantially unchanged form, which has been substantially freed of calcium salts by precipitation and which has been substantially freed of remaining low molecular weight substances by dialysis.

11. A vacuum concentrated waste sulphite spruce wood liquor containing its high molecular weight colloidal complexes in substantially unchanged form, which has been substantially freed of calcium salts by precipitation and which has been substantially freed of remaining low molecular weight substances by dialysis through a regenerated cellulose diaphragm.

12. A novel vacuum concentrated processed waste wood pulp liquor comprising the substantially unchanged high molecular weight colloidal substances contained in the original liquor, from which has been removed low molecular weight substances, said processed liquor containing substantially all of the substantially unchanged colloidal substances present in the original liquor and less than about 15% of other solids.

13. A novel vacuum concentrated processed waste wood pulp liquor comprising the substantially unchanged high molecular weight colloidal substances contained in the original liquor, from which has been removed low molecular weight substances, said processed liquor containing substantially all of the substantially unchanged colloidal substances present in the original liquor and less than 0.3% of sugars.

14. As a new product, a surface-active material consisting of a vacuum concentrated waste pulp liquor which has been substantially completely dialyzed, which material when added in amounts from 0.65 to .95% to an aqueous paste containing 85% zinc oxide will cause the zinc oxide paste to flow like a heavy oil at slow rates of flow but resist flow like a solid at higher rates of flow.

15. As a new product, a surface-active material consisting of a vacuum concentrated waste sulphite liquor which has been substantially completely dialyzed, which material when added in amounts from 0.65 to 0.75% calculated on the basis of the zinc oxide alone to an aqueous paste containing 85% zinc oxide will cause the zinc oxide paste to flow like a heavy oil at slow rates of flow but resist flow like a solid at higher rates of flow.

16. As a new product, a surface-active material consisting of a vacuum concentrated waste coniferous wood sulphite liquor which has been substantially completely dialyzed, which material when added in amounts between about 0.65 to 0.75% calculated on the basis of the zinc oxide alone to an aqueous paste containing 85% zinc oxide will cause the zinc oxide paste to flow like a heavy oil at slow rates of flow but resist flow like a solid at higher rates of flow.

17. As a new product, a surface-active material consisting of a dialyzed vacuum concentrated waste wood pulp liquor which when added to dry cement clinker in amounts not over 0.04% will increase the specific surface generated by dry grinding the cement clinker by 16% over the specific surface which is generated when the same cement clinker is ground in the same mill for the same length of time without addition agents.

18. As a new product, a surface-active material consisting of a dialyzed waste sulphite liquor which when added to dry cement clinker of 2400 square centimeters of surface area per gram in amounts not over 0.05% will increase the specific surface generated by dry grinding the cement clinker by at least 20% over the specific surface which is generated when the same cement clinker is ground in the same mill for the same length of time without addition agent.

19. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquor into the water and heating at least one of said flowing liquids before said passage to a temperature of about between 100 to 160° F.

20. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquor into the water and maintaining a higher head of water than of the liquor while said liquor and water flow across said membrane.

21. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquor into the water, concentrating the liquor after it has flowed across said membrane, and then again flowing it across one side of said membrane while water is flowing across the other side of said membrane.

22. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquor into the water and automatically stopping the flow upon breakage of the membrane.

23. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquid into the water and adding small amounts of ammonia to the water before flow across said membrane.

24. In a process of dialyzing a waste wood pulp liquor containing a mixture of high and low molecular weight compounds, the steps of flowing said liquor across one side of a thin semi-permeable membrane and flowing water across the other side thereof, whereby the low molecular weight compounds pass through said membrane from the liquor into the water, maintaining a higher head of water than of the liquor while said liquor and water flow across said membrane and automatically stopping flow as soon as said difference in head is not maintained.

FRIEDRICH KONRAD DANIEL.